US010871840B2

(12) United States Patent
Baek (10) Patent No.: US 10,871,840 B2
(45) Date of Patent: Dec. 22, 2020

(54) TOUCH SENSOR AND TOUCH DISPLAY DEVICE INCLUDING THE SAME (71) Applicant: Samsung Display Co., Ltd., Yongin-si, Gyeonggi-do (KR)

(72) Inventor: Seung Ho Baek, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/018,596

(22) Filed: Jun. 26, 2018

(65) Prior Publication Data

US 2019/0171317 A1 Jun. 6, 2019

(30) Foreign Application Priority Data

Dec. 6, 2017 (KR) ........................ 10-2017-0166902

(51) Int. Cl.
*G06F 3/044* (2006.01)
*G06F 3/041* (2006.01)

(52) U.S. Cl.
CPC ............ *G06F 3/0412* (2013.01); *G06F 3/044* (2013.01); *G06F 3/0443* (2019.05); *G06F 3/0448* (2019.05); *G06F 3/04164* (2019.05); *G06F 3/0416* (2013.01)

(58) Field of Classification Search
CPC combination set(s) only.
See application file for complete search history.

(56) References Cited

U.S. PATENT DOCUMENTS

| 7,663,607 | B2 | 2/2010 | Hotelling et al. | |
|---|---|---|---|---|
| 9,424,722 | B2 | 8/2016 | Adrezin et al. | |
| 2009/0066670 | A1* | 3/2009 | Hotelling | G06F 3/0416 345/174 |
| 2009/0314621 | A1* | 12/2009 | Hotelling | G06F 3/0416 200/600 |
| 2010/0149108 | A1* | 6/2010 | Hotelling | G06F 3/044 345/173 |
| 2014/0054156 | A1* | 2/2014 | Chang | H03K 17/9622 200/600 |
| 2014/0145999 | A1* | 5/2014 | Den Boer | G06F 3/0412 345/174 |

(Continued)

FOREIGN PATENT DOCUMENTS

KR 10-1683829 B1 12/2016
KR 10-2017-0041659 A 4/2017

*Primary Examiner* — Md Saiful A Siddiqui
(74) *Attorney, Agent, or Firm* — Lewis Roca Rothgerber Christie LLP (57) ABSTRACT

A touch sensor includes first touch electrodes respectively coupled to first touch lines, the first touch electrodes being arranged on a first column, second touch electrodes respectively coupled to second touch lines, the second touch electrodes being arranged on a second column that is adjacent to the first column in a row direction, a first multiplexer to which the first touch lines are coupled, and a second multiplexer to which the second touch lines are coupled, wherein the first touch electrodes have respective areas that become smaller as they become closer to the first multiplexer along a first direction, wherein the second touch electrodes have respective areas that become smaller as they become closer to the second multiplexer along a second direction, and wherein the first direction and the second direction are opposite to each other.

14 Claims, 8 Drawing Sheets

(56) References Cited

U.S. PATENT DOCUMENTS

| | | | |
|---|---|---|---|
| 2015/0002453 A1* | 1/2015 | Lu | G06F 3/0416 |
| | | | 345/174 |
| 2015/0324033 A1 | 11/2015 | Kim et al. | |
| 2016/0299608 A1* | 10/2016 | Choi | G06F 3/0416 |
| 2017/0329452 A1* | 11/2017 | Liu | G06F 3/044 |

\* cited by examiner

TOUCH SENSOR AND TOUCH DISPLAY DEVICE INCLUDING THE SAME

CROSS-REFERENCE TO RELATED APPLICATION

This application claims priority to, and the benefit of, Korean patent application 10-2017-0166902 filed on Dec. 6, 2017 in the Korean Intellectual Property Office, the entire disclosure of which is incorporated herein by reference.

BACKGROUND

1. Field

An aspect of the present disclosure relates to a touch sensor, and to a touch display device including the same.

2. Related Art

With the development of information technologies, the importance of a display device, which is a connection medium between a user and information, increases. Accordingly, display devices, such as a liquid crystal display device, an organic light emitting display device, and a plasma display panel, are increasingly used.

Such a display device may include a touch sensor provided on a display surface thereof to serve as a touch display device. A user may input information by touching the touch sensor while viewing an image displayed on the display surface of the touch display device.

SUMMARY

Embodiments provide a touch sensor that has spatial efficiency and can improve visibility, and a touch display device including the touch sensor.

According to an aspect of the present disclosure, there is provided a touch sensor including first touch electrodes respectively coupled to first touch lines, the first touch electrodes being arranged on a first column, second touch electrodes respectively coupled to second touch lines, the second touch electrodes being arranged on a second column that is adjacent to the first column in a row direction, a first multiplexer to which the first touch lines are coupled, and a second multiplexer to which the second touch lines are coupled, wherein the first touch electrodes have respective areas that become smaller as they become closer to the first multiplexer along a first direction, wherein the second touch electrodes have respective areas that become smaller as they become closer to the second multiplexer along a second direction, and wherein the first direction and the second direction are opposite to each other.

A first touch electrode having a smallest area among the first touch electrodes may be located on a same row as a second touch electrode having a largest area among the second touch electrodes, and a second touch electrode having a smallest area among the second touch electrodes may be located on a same row as a first touch electrode having a largest area among the first touch electrodes.

Each of the first touch electrodes and the second touch electrodes may have a rectangular shape having a first side and a second side parallel to the first side, wherein the first touch electrodes are aligned such that their first sides are located on a first straight line extending in a column direction, wherein the second touch electrodes are aligned such that their second sides are located on a second straight line extending in the column direction, and wherein the first straight line and the second straight line are parallel to each other.

A number of touch lines between the first and second touch electrodes on each of respective rows may be the same for all of the rows, wherein the touch lines include at least some of the first touch lines and the second touch lines.

The sum of areas of first and second touch electrodes on each of respective rows may be the same for all of the rows.

Each of the first touch electrodes and the second touch electrodes may have a rhombus shape having a first vertex and a second vertex, wherein the first touch electrodes are aligned such that their first vertices are located on a first straight line extending in a column direction, wherein the second touch electrodes are aligned such that their second vertices are located on a second straight line extending in the column direction, and wherein the first straight line and the second straight line are parallel to each other.

A number of touch lines between the first and second touch electrodes on each of respective rows may be the same for all of the rows, wherein the touch lines include at least some of the first touch lines and the second touch lines.

Each of the first touch lines may have a shape that extends obliquely from one vertex of a corresponding first touch electrode to be bent in the first direction, and each of the second touch lines may have a shape that extends obliquely from one vertex of a corresponding second touch electrode to be bent in the second direction.

According to an aspect of the present disclosure, there is provided a touch display device including a touch sensor, and a display panel combined with the touch sensor, wherein the touch sensor includes first touch electrodes respectively coupled to first touch lines, the first touch electrodes being arranged on a first column, second touch electrodes respectively coupled to second touch lines, the second touch electrodes being arranged on a second column that is adjacent to the first column in a row direction, a first multiplexer to which the first touch lines are coupled, and a second multiplexer to which the second touch lines are coupled, wherein the first touch electrodes have respective areas that become increasingly smaller as they approach the first multiplexer along a first direction, and the second touch electrodes have respective areas that become increasingly smaller as they approach the second multiplexer along a second direction, wherein the first direction and the second direction are opposite to each other, and wherein the display panel includes a pixel area including pixels on a bottom of the first electrodes and the second touch electrodes, a pad area including pad electrodes, a first path selection area in which the first multiplexer is located, and a second path selection area in which the second multiplexer is located.

The touch sensor may further include third touch electrodes respectively coupled to third touch lines, the third touch electrodes being arranged on a third column that is adjacent to the second column in the row direction, fourth touch electrodes respectively coupled to fourth touch lines, the fourth touch electrodes being arranged on a fourth column that is adjacent to the third column in the row direction, a third multiplexer coupled to the third touch lines, the third multiplexer being located in the first path selection area, and a fourth multiplexer coupled to the fourth touch lines, the fourth multiplexer being located in the second path selection area.

The touch display device may further include a first multiplexer line coupling the first multiplexer to some of the pad electrodes, a second multiplexer line coupling the second multiplexer to some of the pad electrodes, a third multiplexer line coupling the third multiplexer to some of the pad electrodes, and a fourth multiplexer line coupling the fourth multiplexer to some of the pad electrodes.

The first multiplexer line and the second multiplexer line may extend adjacent to one side of the pixel area, and the third multiplexer line and the fourth multiplexer line may extend adjacent to the other side of the pixel area.

The first multiplexer line, the second multiplexer line, the third multiplexer line, and the fourth multiplexer line may extend adjacent to one side of the pixel area.

According to an aspect of the present disclosure, there is provided a touch sensor including first touch electrodes respectively coupled to first touch lines, the first touch electrodes being respectively arranged on a first column and a second column that is adjacent to the first column in a row direction, second touch electrodes respectively coupled to second touch lines, the second touch electrodes being respectively arranged on the first column and the second column, a first multiplexer coupled to the first touch lines coupled to the first touch electrodes arranged on the first column, a second multiplexer coupled to the first touch lines coupled to the first touch electrodes arranged on the second column, a third multiplexer coupled to the second touch lines coupled to the second touch electrodes arranged on the first column, and a fourth multiplexer coupled to the second touch lines coupled to the second touch electrodes arranged on the second column, wherein the first touch electrodes have respective areas that become increasingly smaller as they approach the first multiplexer or the second multiplexer along a first direction, wherein the second touch electrodes have respective areas that become increasingly smaller as they approach the third multiplexer or the fourth multiplexer along a second direction, and wherein the first direction and the second direction are opposite to each other.

A number of first touch lines coupled to the first multiplexer, a number of first touch lines coupled to the second multiplexer, a number of second touch lines coupled to the third multiplexer, and a number of second touch line coupled to the fourth multiplexer may be the same.

A number of first touch electrodes arranged on the second column may be greater than that of first touch electrodes arranged on the first column, and a number of second touch electrodes arranged on the first column may be greater than that of second touch electrodes arranged on the second column.

Each of the first touch electrodes and the second touch electrodes may have a rectangular shape having a first side and a second side that is parallel to the first side, wherein the first touch electrodes and the second touch electrodes that are arranged on the first column are aligned such that their first sides are located on a first straight line extending in a column direction, wherein the first touch electrodes and the second touch electrodes that are arranged on the second column are aligned such that their second sides are located on a second straight line extending in the column direction, and wherein the first straight line and the second straight line are parallel to each other.

BRIEF DESCRIPTION OF THE DRAWINGS

Embodiments will now be described more fully hereinafter with reference to the accompanying drawings, although the described embodiment may be embodied in different forms, and should not be construed as being strictly limited to the embodiments set forth herein.

DETAILED DESCRIPTION

Features of the inventive concept and methods of accomplishing the same may be understood more readily by reference to the following detailed description of embodiments and the accompanying drawings. The described embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes and thicknesses of elements, layers, regions, and components may be exaggerated for clarity, and may be arbitrarily shown for better understanding and ease of description, but the present disclosure is not limited thereto.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
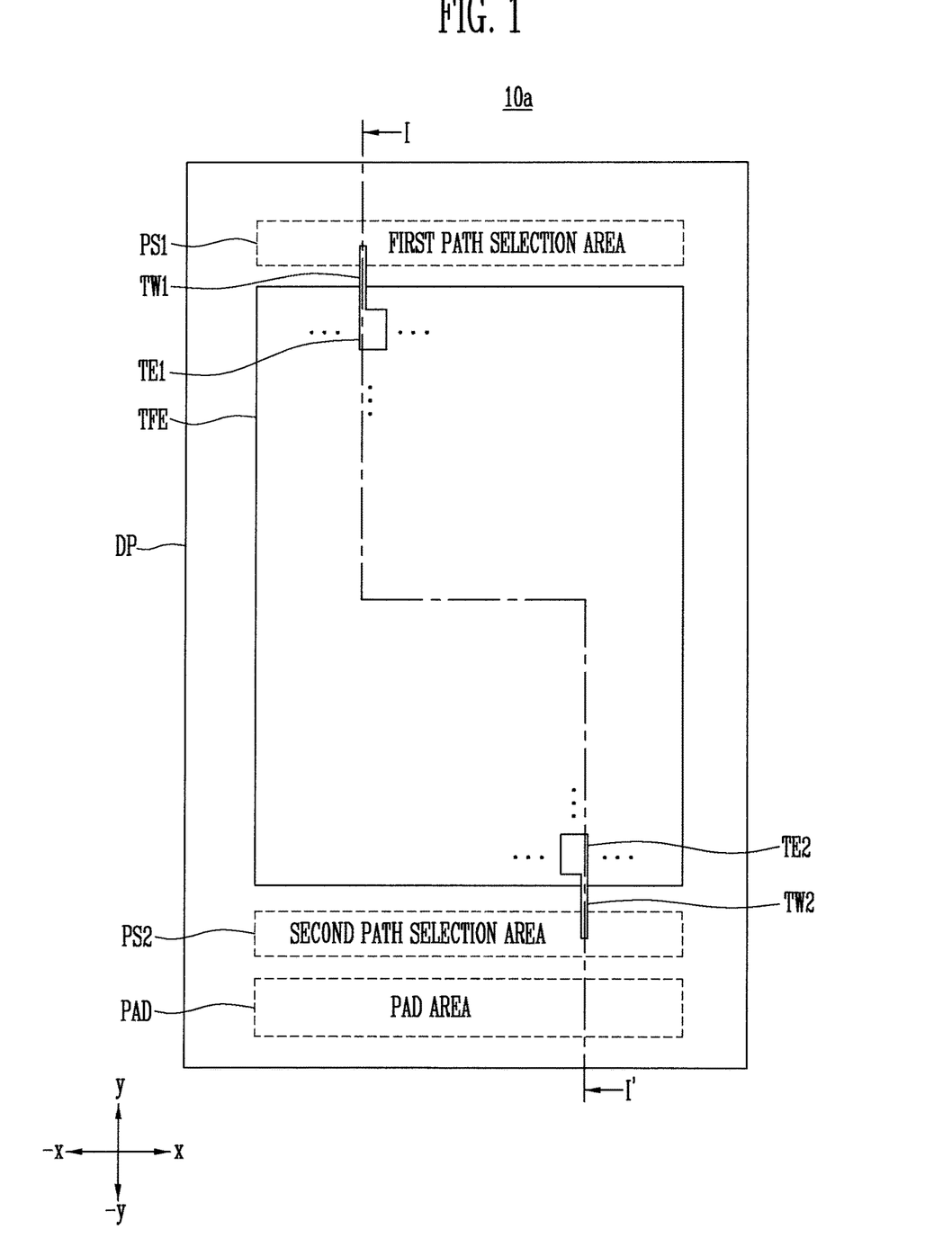
FIG. 1 is a plan view of a touch display device according to an embodiment of the present disclosure.
Figure 2:
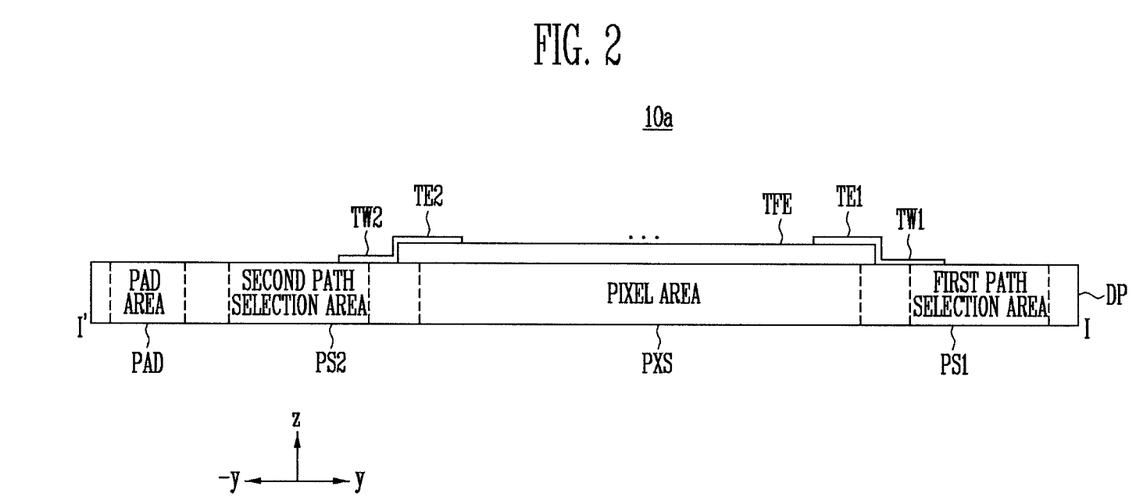
FIG. 2 is a sectional view taken along the line I-I' of the touch display device of FIG. 1.

FIG. 1 is a plan view of a touch display device according to an embodiment of the present disclosure. FIG. 2 is a sectional view taken along the line I-I' of the touch display device of FIG. 1.

Referring to FIGS. 1 and 2, the touch display device 10a includes a touch sensor and a display panel DP. The touch sensor may include touch electrodes TE1, TE2, ..., touch lines TW1, TW2, ..., and multiplexers (see FIG. 4). The display panel DP may include a first path selection area PS1, a second path selection area PS2, a pad area PAD, a pixel area PXS, and an encapsulation layer TFE.

The pixel area PXS may include pixels. For example, each pixel may include an organic light emitting diode, a storage capacitor, and transistors. In each pixel, under the control of a controller (e.g., a pixel driving IC, etc.), the on/off state of the transistors may be determined, a data voltage may be charged in the storage capacitor, and the organic light emitting diode may emit light with a gray scale corresponding to the charged data voltage. The touch display device 10a may display various images through light emitting combinations of the pixels.

The encapsulation layer TFE may cover the top of the pixel area PXS to protect the pixels. For example, the encapsulation layer TFE may have a single-layered structure or a multi-layered structure configured with an organic layer, an inorganic layer, and the like. The inorganic layer may protect the pixels by reducing or preventing moisture or oxygen from penetrating into the pixels, and the organic layer may reduce or prevent the generation or propagation of cracks.

The touch electrodes TE1, TE2, ... may be located on the top of the pixel area PXS. As shown in FIGS. 1 and 2, the touch electrodes TE1, TE2, ... are formed on the encapsulation layer TFE. However, in another embodiment, the touch electrodes TE1, TE2, ... may be formed under the encapsulation layer TFE. In still another embodiment, the encapsulation layer TFE may be replaced with an upper substrate, and the touch electrodes TE1, TE2, ... may be located on the top or bottom of the upper substrate.

It is unnecessary that the touch electrodes TE1, TE2, ... should be located on the top of the pixel area PXS. The touch electrodes TE1, TE2, ... may be located on a side surface or back surface of the touch display device 10a, as may be suitable.

The touch electrodes TE1, TE2, ... according to the present embodiment are respectively coupled to the touch lines TW1, TW2, ... corresponding thereto. The touch electrodes TE1, TE2, ... may include a first touch electrode TE1 coupled to the first path selection area PS1 through a first touch line TW1, and a second touch electrode TE2 coupled to the second path selection area PS2 through a second touch line TW2.

The first path selection area PS1 and the second path selection area PS2 may be respectively located along a first direction (y) and a second direction (-y) with respect to the pixel area PXS. The first direction (y) and the second direction (-y) are opposite to each other.

Each of the first path selection area PS1 and the second path selection area PS2 includes a multiplexer corresponding thereto, and the multiplexer couples a selected touch line among a plurality of touch lines coupled thereto to a corresponding pad electrode. Pad electrodes are located in the pad area PAD.

Some of the pad electrodes of the pad area PAD may be coupled to the pixels of the pixel area PXS. A controller (e.g., a pixel driving IC, a touch driving IC, or a combination thereof) may be directly bonded and coupled to the pad electrodes. A flexible printed circuit board (FPCB) may be coupled to the pad electrodes, and the controller may be coupled on the FPCB.

Figure 3:
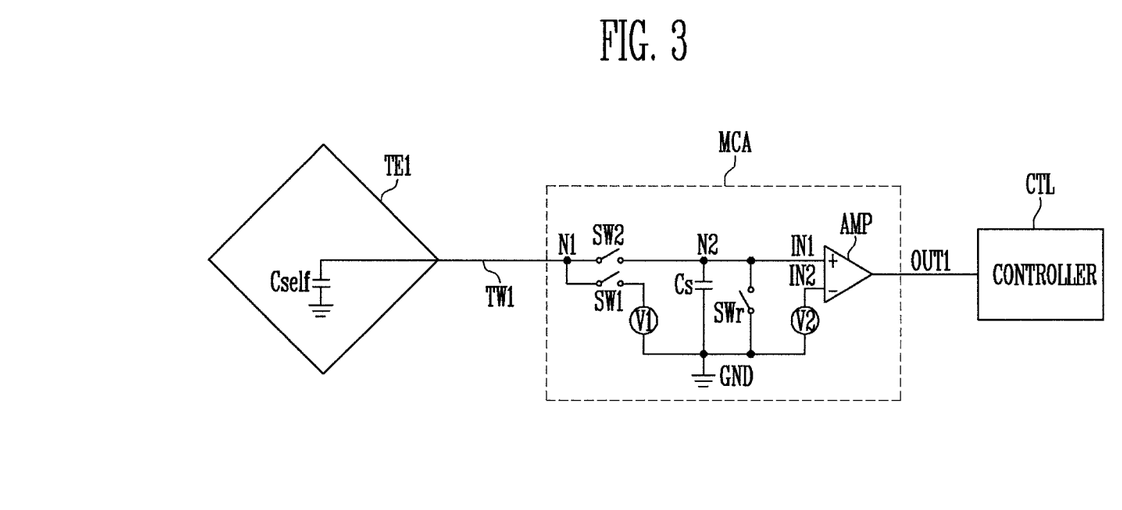
FIG. 3 is a view illustrating a touch driving system of a touch sensor.

FIG. 3 is a view illustrating a touch driving system of the touch sensor.

In FIG. 3, a touch driving system for the first touch electrode TE1 coupled to the first touch line TW1 is illustrated. The first touch line TW1 may be coupled to a controller CTL via switches SW1, SW2, and/or SWr, a capacitor Cs, and/or an intermediate circuit unit MCA including an amplifier AMP. The position of the intermediate circuit unit MCA may be changed depending on a type of product. As an example, the intermediate circuit unit MCA may be located in the first path selection area PS1, and may be integrally formed with the controller CTL. As another example, the intermediate circuit unit MCA may be located in the first path selection area PS1 from a node N1 to a node IN1, and the amplifier AMP may be integrally formed with the controller CTL. FIG. 3 is an example for illustrating the touch driving system, and those skilled in the art may implement a similar touch driving system through another circuit.

Referring to FIG. 3, the first touch electrode TE1 has a self-capacitor Cself with respect to a reference voltage (e.g., a ground voltage). Here, the reference voltage may be a voltage that is also applied to a cathode electrode of the pixel area PXS. Alternatively, in some embodiments, a separate electrode for forming the self-capacitor Cself of the first touch electrode TE1 may be provided.

If the switch SW1 is turned on during a first period, a voltage source V1 is coupled to the first touch electrode TE1 through the node N1 and the first touch line TW1. Accordingly, the self-capacitor Cself is charged with charges supplied by the voltage source V1. If a touch is input to the first touch electrode TE1 by a portion (e.g., a finger) of the body of a user, some of the charges are introduced into a touch capacitor formed between the first touch electrode TE1 and the portion of the body of the user, and therefore, the self-capacitor Cself may be charged with a quantity of charges, which is smaller than a usual quantity of charges.

Next, in a second period, the switch SW1 is turned off and the switch SW2 is turned on, so that the node N1 is coupled to a node N2. Accordingly, charge sharing occurs between the self-capacitor Cself and the capacitor Cs, and the capacitor Cs is charged. At this time, the amplifier AMP is operated as a comparator. The amplifier AMP may compare voltages of a voltage source V2 and the capacitor Cs, and may output the compared result to a node OUT1. As an example, when not any touch of the user occurs, the voltage of the capacitor Cs is larger than that of the voltage source V2, so that a positive voltage signal can be output to the node OUT1. As another example, when a touch of the user occurs, the voltage of the capacitor Cs is smaller than that of the voltage source V2, so that a negative voltage signal can be output to the node OUT1.

When the positive voltage signal is received, the controller CTL may determine that no touch of the user has occurred. When the negative voltage signal is received, the controller CTL may determine that a touch of the user has occurred.

Next, in a third period, as the switch SWr is turned on, the charges stored in the capacitor Cs are discharged, so that the capacitor Cs can be initialized.

The description of FIG. 3 may be applied to all touch electrodes of the present embodiment, which are coupled to their corresponding touch lines, in addition to the first touch electrode TE1.

Figure 4:
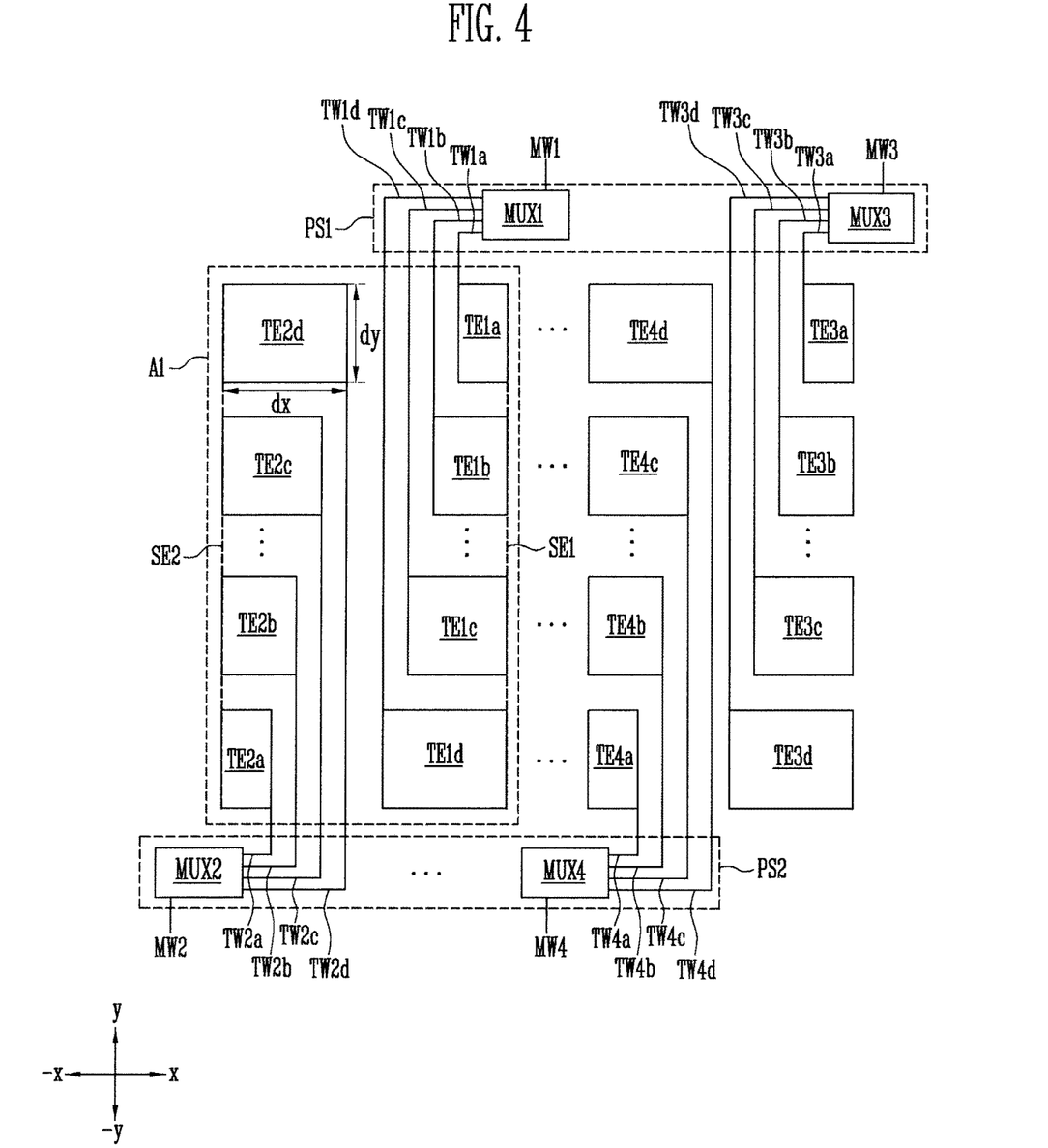
FIG. 4 is a view illustrating a touch sensor according to a first embodiment of the present disclosure.

FIG. 4 is a view illustrating a touch sensor according to a first embodiment of the present disclosure.

Referring to FIG. 4, the touch sensor according to the first embodiment of the present disclosure includes first touch electrodes TE1a, TE1b, TE1c, and TE1d, second touch electrodes TE2a, TE2b, TE2c, and TE2d, a first multiplexer MUX1, and a second multiplexer MUX2. The touch sensor of the first embodiment may further extend in a row direction (x). In this case, the touch sensor may further include third touch electrodes TE3a, TE3b, TE3c, and TE3d, fourth touch electrodes TE4a, TE4b, TE4c, and TE4d, a third multiplexer MUX3, and a fourth multiplexer MUX4. Hereinafter, the first touch electrodes TE1a to TE1d, the second touch electrodes TE2a to TE2d, the first multiplexer MUX1, and the second multiplexer MUX2 will be described to avoid redundancy, and their descriptions may be similarly applied to the third touch electrodes TE3a to TE3d, the fourth touch electrodes TE4a to TE4d, the third multiplexer MUX3, and the fourth multiplexer MUX4.

The touch electrodes shown in FIG. 4 may be arranged in an approximately matrix form. For example, the touch electrodes TE2d, TE1a, TE4d, and TE3a may be located on the same row, and the touch electrodes TE2d, TE2c, TE2b, and TE2a may be located on the same column. Therefore, hereinafter, the row direction indicates an x or −x direction, and the column direction indicates a y or −y direction.

The first touch electrodes TE1a to TE1d are coupled one-to-one to respective first touch lines TW1a, TW1b, TW1c, and TW1d, and are arranged on a first column.

The second touch electrodes TE2a to TE2d are coupled one-to-one to respective second touch lines TW2a, TW2b, TW2c, and TW2d, and are arranged on a second column that is adjacent in the row direction (x) to the first column.

The first multiplexer MUX1 is coupled to the first touch lines TW1a to TW1d. The first multiplexer MUX1 couples at least one of the first touch lines TW1a to TW1d to a first multiplexer line MW1 in response to a control signal. The first multiplexer line MW1 is coupled to the controller CTL through a pad electrode.

The second multiplexer MUX2 is coupled to the second touch lines TW2a to TW2d. The second multiplexer MUX2 couples at least one of the second touch lines TW2a to TW2d to a second multiplexer line MW2 in response to a control signal. The second multiplexer line MW2 is coupled to the controller CTL through a pad electrode.

The shape of the first column configured with the first touch electrodes TE1a to TE1d may be a wedge shape of which width is entirely narrowed along a first direction (y). In addition, the shape of the second column configured with the second touch electrodes TE2a to TE2d may be a wedge shape of which width is entirely or gradually narrowed along a second direction (−y). The expression "right triangular shape" may be used rather than the expression "wedge shape." The first touch electrodes TE1a to TE1d and the second touch electrodes TE2a to TE2d may be arranged in a form in which they are engaged with each other.

For example, the first touch electrodes TE1a to TE1d have areas that become smaller as they become more adjacent to the first multiplexer MUX1 along the first direction (y). The first direction (y) may be a column direction. Thus, the first multiplexer MUX1 is located most adjacent to the first touch electrode TE1a having the smallest area, and is located most distant from the first electrode TE1d having the largest area. Therefore, the first multiplexer MUX1 may be located at an end portion of the first direction (y) on the first column configured with the first touch electrodes TE1a to TE1d.

The second touch electrodes TE2a to TE2d have areas that become smaller as they become more adjacent to the second multiplexer MUX2 along the second direction (−y). The second direction (−y) may be a column direction. The first direction (y) and the second direction (−y) may be opposite to each other. Thus, the second multiplexer MUX2 is located most adjacent to the second touch electrode TE2a having the smallest area, and is located most distant from the second touch electrode TE2d having the largest area. Therefore, the second multiplexer MUX2 may be located at an end portion of the second direction (−y) on the second column configured with the second touch electrodes TE2a to TE2d. Accordingly, the first and second multiplexers MUX1 and MUX2 are alternatively disposed in units of columns, and the first and second multiplexers MUX1 and MUX2 are disposed in different directions with respect to the touch electrodes TE1a to TE1d and TE2a to TE2d. Therefore, excessive concentration, or clustering, of the touch lines TW1a to TW2d is reduced or prevented.

In addition, the first touch electrode TE1a having the smallest area among the first touch electrodes TE1a to TE1d may be located on the same row as the second touch electrode TE2d having the largest area among the second touch electrodes TE2a to TE2d. In the embodiment of FIG. 4, the first touch electrode TE1a and the second touch electrode TE2d are located on the same first row. The first row is adjacent to the first multiplexer MUX1.

In addition, the second touch electrode TE2a having the smallest area among the second touch electrodes TE2a to TE2d may be located on the same row as the first touch electrode TE1d having the largest area among the first touch electrodes TE1a to TE1d. In the embodiment of FIG. 4, the second touch electrode TE2a and the first touch electrode TE1d are located on the same last row. The last row is adjacent to the second multiplexer MUX2.

In addition, each of the first touch electrodes TE1a to TE1d and the second touch electrodes TE2a to TE2d may have a rectangular shape having a first side, and a second side parallel to the first side. For example, on FIG. 4, the first side may be a left side and the second side may be a right side.

At this time, the first touch electrodes TE1a to TE1d may be aligned such that their first sides are located on a first straight line SE1 extending in the column direction, and the second touch electrodes TE2a to TE2d may be aligned such that their second sides are located on a second straight line SE2 extending in the column direction. At this time, the first straight line SE1 and the second straight line SE2 may be parallel to each other.

In addition, the number of touch lines located between the first and second electrodes on the respective rows may be the same. At this time, the touch lines may mean at least some of the first touch lines TW1a to TW1d and the second touch lines TW2a to TW2d. For example, when assuming that each column is configured with four touch electrodes, three touch lines TW1b, TW1c, and TW1d may be located between a first touch electrode TE1a and a second touch electrode TE2d on a first row. Similarly, three touch lines TW1c, TW1d, and TW2d may be located between a first touch electrode TE1b and a second touch electrode TE2c on a second row, three touch lines TW1d, TW2d, and TW2c may be located between a first touch electrode TE1c and a second touch electrode TE2b on a third row, and three touch lines TW2d, TW2c, and TW2b may be located between a first touch electrode TE1d and a second touch electrode TE2a on a fourth row.

In addition, the sums of areas of the first and second touch electrodes on the respective rows may be the same. For example, the sum of areas of the first touch electrode TE1a and the second touch electrode TE2d on the first row, the sum of areas of the first touch electrode TE1b and the second touch electrode TE2c on the second row, the sum of areas of the first touch electrode TE1c and the second touch electrode TE2b on the third row, and the sum of areas of the first touch electrode TE1d and the second touch electrode TE2a on the fourth row may be the same. More specifically, when the touch electrodes have the same height dy, the sums of widths dx of first and second touch electrodes on the respective rows may be the same.

According to the above-described embodiments, the first touch electrodes TE1a to TE1d of the first column and the second touch electrodes TE2a to TE2d of the second column entirely or collectively form a rectangular shape while being engaged with each other, or while complementing the shape of each other, in wedge shapes extending in directions opposite to each other, which is spatially efficient. That is, the touch sensor may include additional touch electrode columns ( . . . , and TE3a to TE4d) further extending in the row direction, if necessary.

Further, according to the above-described embodiments, the sums of areas of touch electrodes and the numbers of touch lines on the respective rows are the same, and thus the reflexibilities on the respective rows are the same. Accordingly, although the touch electrodes are located on the pixel area PXS, any degradation of visibility due to a difference in reflexibility does not occur.

Hereinafter, the other components of FIG. 4 will be described, but their overlapping descriptions will be omitted.

The third touch electrodes TE3a to TE3d are coupled one-to-one to respective third touch lines TW3a to TW3d, and may be arranged on a third column located adjacent to the second column in a row direction (x) (e.g., with a fourth column therebetween). The fourth touch electrodes TE4a to TE4d are coupled one-to-one to respective fourth touch lines TW4a to TW4d, and may be arranged on a fourth column located adjacent to the third column in a row direction (−x).

The third multiplexer MUX3 is coupled to the third touch lines TW3a to TW3d, and may be located in the first path selection area PS1. The fourth multiplexer MUX4 is coupled to the fourth touch lines TW4a to TW4d, and may be located in the second path selection area PS2.

The first multiplexer line MW1 may couple the first multiplexer MUX to some of the pad electrodes, the second multiplexer line MW2 may couple the second multiplexer MUX to some of the pad electrodes, a third multiplexer line MW3 may couple the third multiplexer MUX3 to some of the pad electrodes, and a fourth multiplexer line MW4 may couple the fourth multiplexer MUX4 to some of the pad electrodes.

Although not shown in FIG. 4, when the number of multiplexers MUX1, MUX2, MUX3, and MUX4 increases, the touch sensor may further include a rear end multiplexer. For example, the multiplexer lines MW1, MW2, MW3, and MW4 may be coupled to the rear end multiplexer, and the rear end multiplexer may couple at least one of the multiplexer lines MW1, MW2, MW3, and MW4 to the controller CTL through a pad electrode in response to a control signal.

Figure 5:
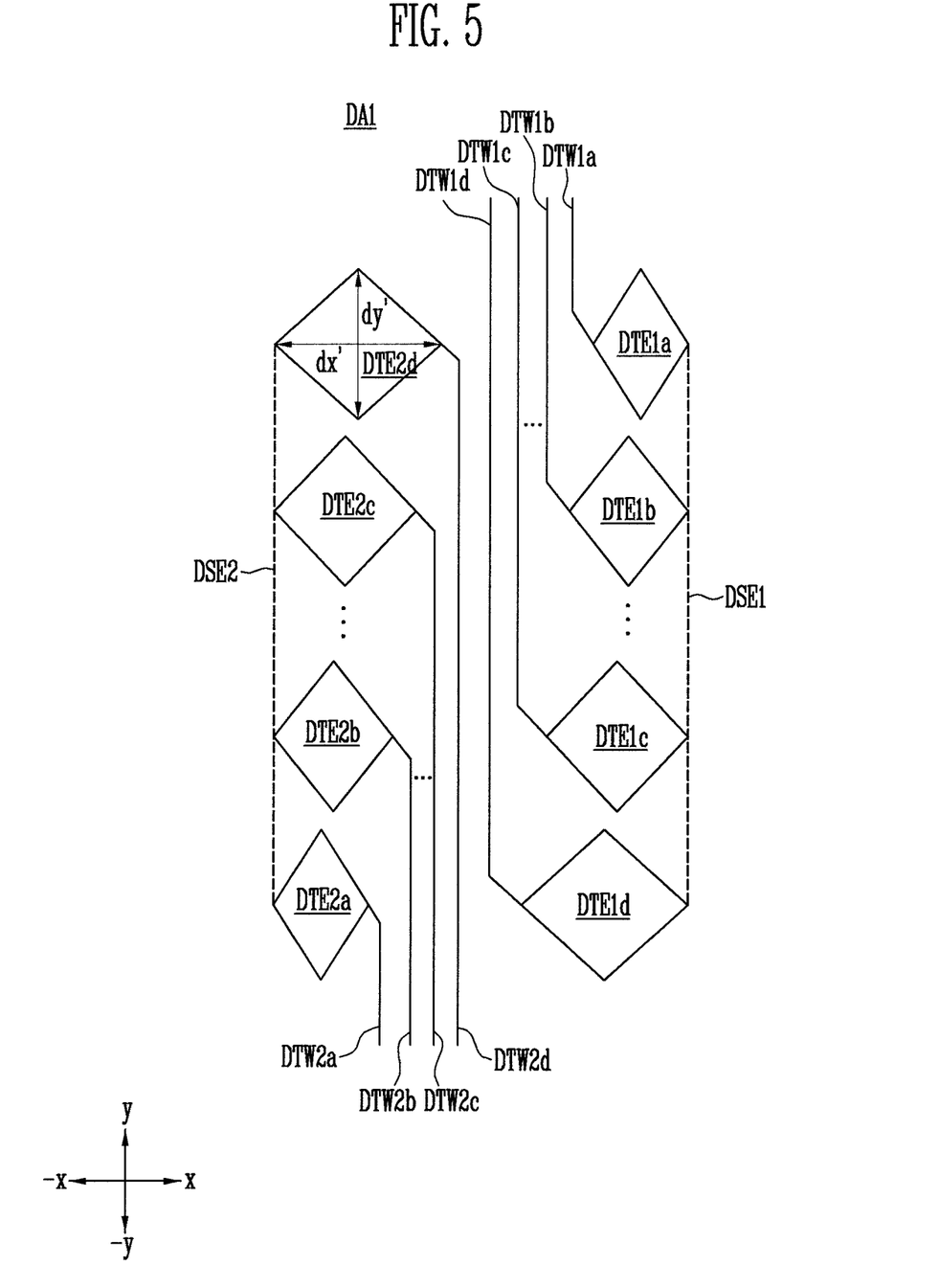
FIG. 5 is a view illustrating a case where touch electrodes having another shape are applied to the touch sensor of the first embodiment.

FIG. 5 is a view illustrating an embodiment where touch electrodes having another shape are applied to the touch sensor of the first embodiment.

In FIG. 5, touch electrodes having a rhombus shape are applied instead of touch electrodes having a rectangular shape, and only an area DA1, which is substituted for the area A1 of FIG. 4, is partially illustrated. Touch electrodes having the rhombus shape may also be applied to other portions that are not illustrated in FIG. 5. The expression "diamond shape" may be used rather than the expression "rhombus shape."

In the embodiment of FIG. 5, each of first touch electrodes DTE1a, DTE1b, . . . , DTE1c, and DTE1d and second touch electrodes DTE2a, DTE2b, DTE2c, and DTE2d may have a rhombus shape having a first vertex and a second vertex. On FIG. 5, the first vertex may be a left vertex of the touch electrode, and the second vertex may be a right vertex of the touch electrode.

The first touch electrodes DTE1a to DTE1d may be aligned such that their first vertices are located on a first straight line DSE1 extending in the column direction, and the second touch electrodes DTE2a to DTE2d may be aligned such that their second vertices are located on a second straight line DSE2 extending in the column direction. At this time, the first straight line DSE1 and the second straight line DSE2 may be parallel to each other.

The numbers of touch lines located between first and second touch electrodes on the respective rows may be the same. At this time, the touch lines may mean at least some of first touch lines DTW1a, DTW1b, DTW1c, and DTW1d and second touch lines DTW2a, DTW2b, DTW2c, and DTW2d.

Each of the first touch lines DTW1a to DTW1d may have a shape that extends along an oblique side (e.g., extends obliquely) from one vertex of a corresponding first touch electrode to be bent in the first direction (y). At this time, the mentioned one vertex of the first touch electrode may be the second vertex of the first touch electrode.

Each of the second touch lines DTW2a to DTW2d may have a shape that extends along an oblique side (e.g., extends obliquely) from one vertex of a corresponding second touch electrode to be bent in the second direction (−y). At this time, the one vertex of the second touch electrode may be the first vertex of the second touch electrode.

In addition, the touch electrodes may have the same height dy', and the sums of widths dx' of the touch electrodes on the respective rows may be the same.

FIG. 5 illustrates that touch electrodes having a modified shape may be applied to the embodiment of FIG. 4, and an effect identical or similar to that of the embodiment of FIG. 4 can be exhibited.

Figure 6:
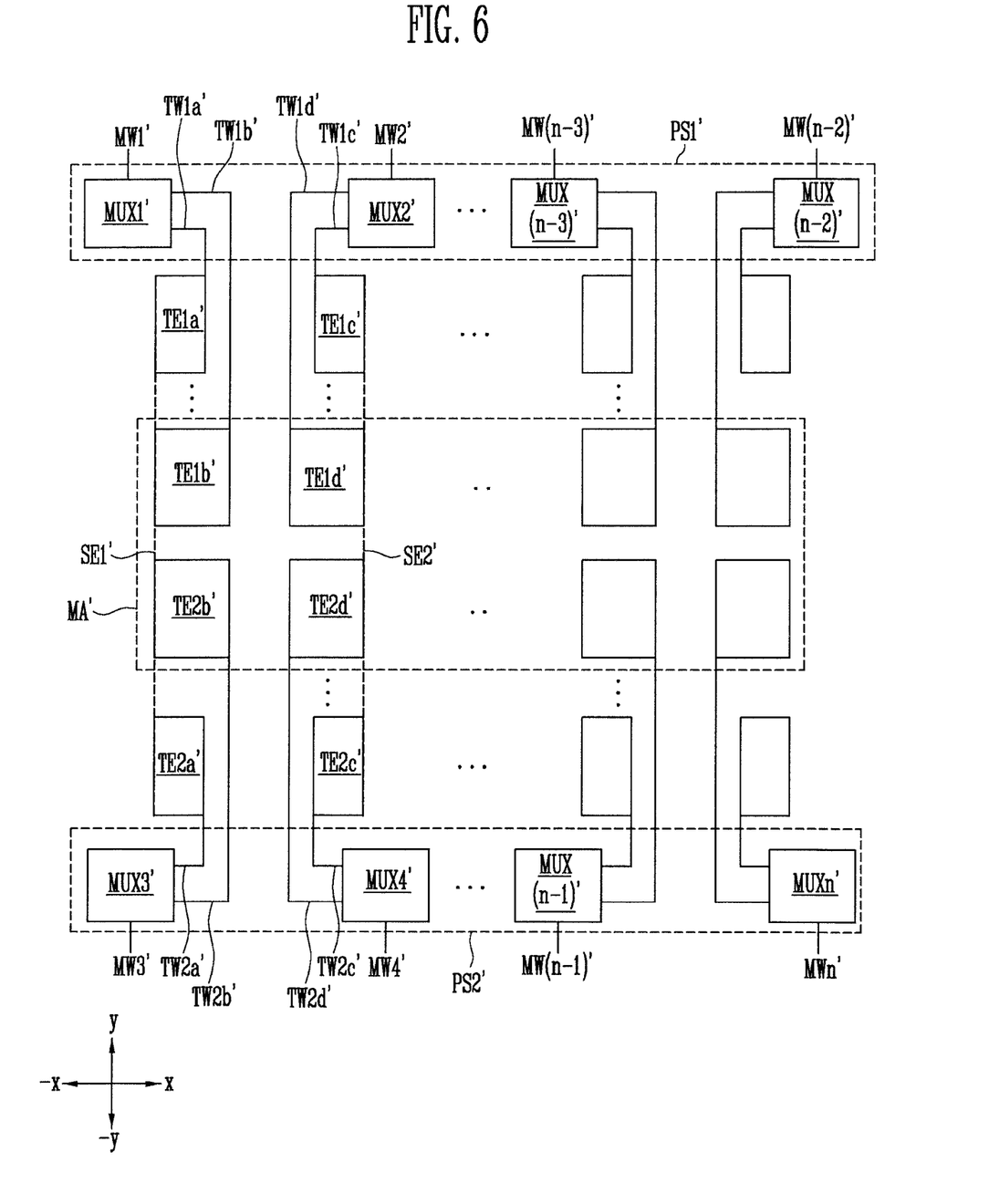
FIG. 6 is a view illustrating a touch sensor according to a second embodiment of the present disclosure.

FIG. 6 is a view illustrating a touch sensor according to a second embodiment of the present disclosure.

Referring to FIG. 6, first touch electrodes TE1a' to TE1d' are coupled one-to-one to respective first touch lines TW1a' to TW1d', and are arranged on a first column and a second column that is adjacent to the first column in the row direction (x). For example, the first touch electrodes TE1a' to TE1b' are arranged on the first column, and the first touch electrodes TE1c' to TE1d' are arranged on the second column.

Second touch electrodes TE2a' to TE2d' are coupled one-to-one to respective second touch lines TW2a' to TW2d', and are disposed on the first column and the second column. For example, the second touch electrodes TE2a' to TE2b' are arranged on the first column, and the second touch electrodes TE2c' to TE2d' are arranged on the second column.

A first multiplexer MUX1' is coupled to the first touch lines TW1a' to TW1b' coupled to the first touch electrodes TE1a' to TE1b' arranged on the first column. A second multiplexer MUX2' is coupled to the first touch lines TW1c' to TW1d' coupled to the first touch electrodes TE1c' to TE1d' arranged on the second column. The first multiplexer MUX1' and the second multiplexer MUX2' may be located in a first path selection area PS1'.

A third multiplexer MUX3' is coupled to the second touch lines TW2a' to TW2b' coupled to the second touch electrodes TE2a' to TE2b' arranged on the first column. A fourth multiplexer MUX4' is coupled to the second touch lines TW2c' to TW2d' coupled to the second touch electrodes TE2c' to TE2d' arranged on the second column. The third multiplexer MUX3' and the fourth multiplexer MUX4' may be located in a second path selection area PS2'.

In the present embodiment, the number of first touch lines TW1a' to TW1b' coupled to the first multiplexer MUX1', the number of first touch lines TW1c' to TW1d' coupled to the second multiplexer MUX2', the number of second touch lines TW2a' to TW2b' coupled to the third multiplexer MUX3', and the number of second touch lines TW2c' to TW2d' coupled to the fourth multiplexer MUX4', are the same.

The first touch electrodes TE1a' to TE1d' have areas that become smaller as they become more adjacent to the first multiplexer MUX1' or the second multiplexer MUX2' along the first direction (y).

The second touch electrodes TE2a' to TE2d' have areas that become smaller as they become more adjacent to the third multiplexer MUX3' or the fourth multiplexer MUX4' along the second direction (−y). The first direction (y) and the second direction (−y) are opposite to each other.

Each of the first touch electrodes TE1a' to TE1d' and the second touch electrodes TE2a' to TE2d' may have a rectangular shape having a first side and a second side that is parallel to the first side. The first touch electrodes TE1a' to TE1b' and the second touch electrodes TE2a' to TE2b, which are arranged on the first column, may be arranged such that their first sides are located on a first straight line SE1' extending in the column direction. The first touch electrodes TE1c' to TE1d' and the second touch electrodes TE2c' to TE2d', which are arranged on the second column, may be aligned such that their second sides are located on a second straight line SE2' extending in the column direction. The first straight line SE1' and the second straight line SE2' may be parallel to each other.

The touch sensor according to the embodiment of FIG. 6 may also extend in the column direction (x), and may further include multiplexers . . . , MUX(n−3)', MUX(n−2)', MUX(n−1)', and MUXn' and touch electrodes. Their overlapping descriptions will be omitted.

Figure 7:
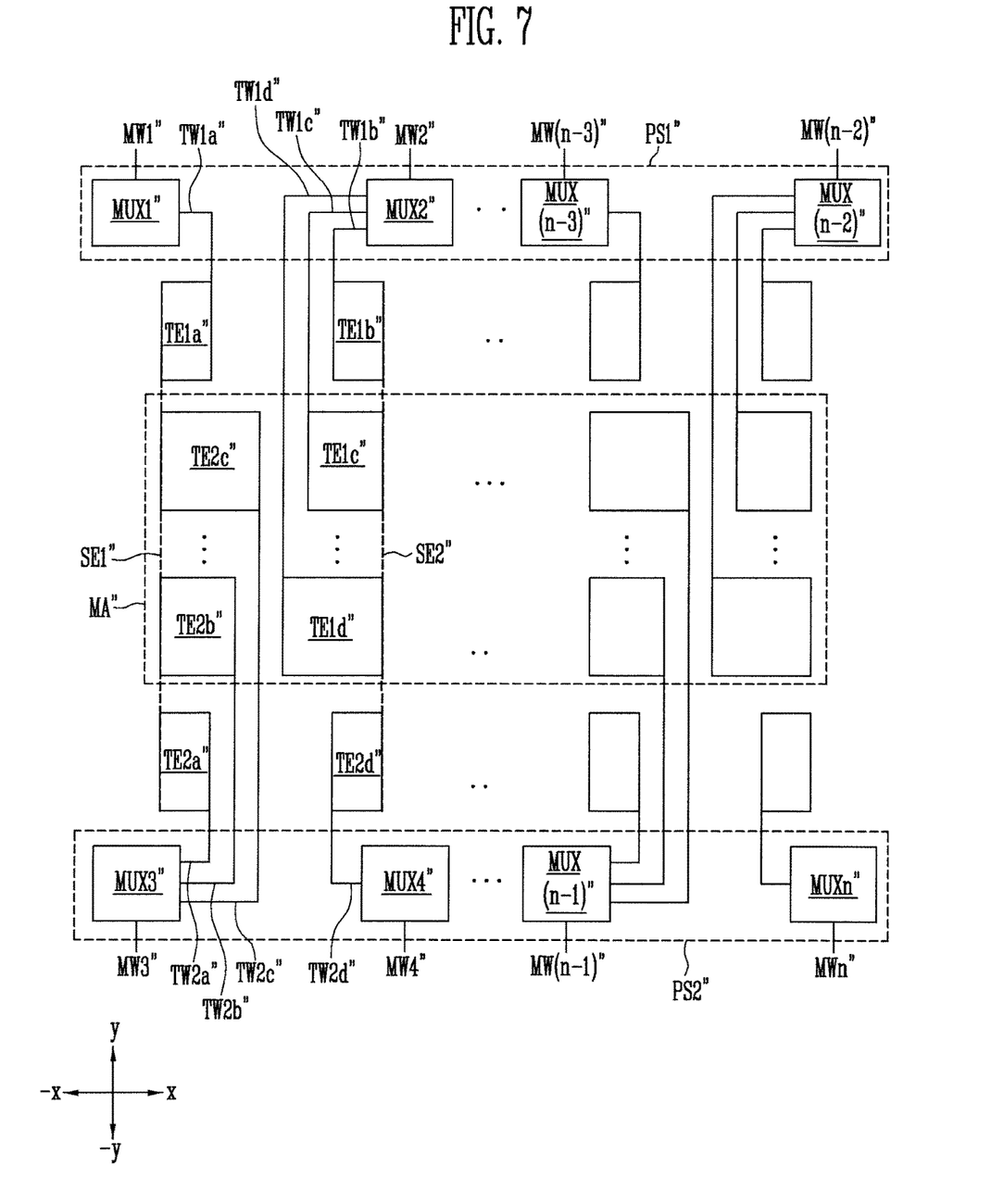
FIG. 7 is a view illustrating a touch sensor according to a third embodiment of the present disclosure.

FIG. 7 is a view illustrating a touch sensor according to a third embodiment of the present disclosure.

Referring to FIG. 7, first touch electrodes TE1a" to TE1d" are coupled one-to-one to respective first touch lines TW1a" to TW1d", and are arranged on a first column and on a second column that is adjacent to the first column in the row direction (x). For example, the first touch electrode TE1a" is disposed on the first column, and the first touch electrodes TE1b", TE1c", and TE1d" are disposed on the second column.

Second touch electrodes TE2a" to TE2d" are coupled one-to-one to respective second touch lines TW2a" to TW2d", and are arranged on the first column and the second column. For example, the second touch electrodes TE2a", TE2b", and TE2c" are disposed on the first column, and the second touch electrode TE2d" is disposed on the second column.

A first multiplexer MUX1" is coupled to the first touch line TW1a" coupled to the first touch electrodes TE1a" arranged on the first column. A second multiplexer MUX2" is coupled to the first touch lines TW1b", TW1c", and TW1d" coupled to the first touch electrodes TE1b", TE1c", and TE1d" arranged on the second column. The first multiplexer MUX1" and the second multiplexer MUX2" may be located in a first path selection area PS1".

A third multiplexer MUX3" is coupled to the second touch lines TW2a", TW2b", and TW2c" coupled to the second touch electrodes TE2a", TE2b", and TE2c" arranged on the first column. A fourth multiplexer MUX4" is coupled to the second touch line TW2d" coupled to the second touch electrodes TE2d" arranged on the second column. The third multiplexer MUX3" and the fourth multiplexer MUX4" may be located in a second path selection area PS2".

The first touch electrodes TE1a" to TE1d" have areas that become smaller as they become more adjacent to the first multiplexer MUX1" or the second multiplexer MUX2" along the first direction (y).

The second touch electrodes TE2a" to TE2d" have areas that become smaller as they become more adjacent to the third multiplexer MUX3" or the fourth multiplexer MUX4" along the second direction (−y). At this time, the first direction (y) and the second direction (−y) are opposite to each other.

Each of the first touch electrodes TE1a" to TE1d" and the second touch electrodes TE2a" to TE2d" may have a rectangular shape having a first side and a second side parallel to the first side. The first touch electrode TE1a" and the second touch electrodes TE2a", TE2b", and TE2c", which are arranged on the first column, may be aligned such that their first sides are located on a first straight line SE1" extending in the column direction. The first touch electrodes TE1b", TE1c", and TE1d" and the second touch electrode TE2d", which are arranged on the second column, may be aligned such that their second sides are located on a second straight line SE2" extending in the column direction. The first straight line SE1" and the second straight line SE2" may be parallel to each other.

Unlike the second embodiment shown in FIG. 6, in the third embodiment shown in FIG. 7, the number of first touch electrodes TE1b", TE1c", and TE1d" arranged on the second column may be greater than that of first touch electrodes TE1a" arranged on the first column, and the number of second touch electrodes TE2a", TE2b", and TE2c" arranged on the first column may be greater than that of second touch electrodes TE2d" arranged on the second column.

Accordingly, the reflexibility distribution of touch electrodes in an intermediate area MA" of the touch sensor according to the third embodiment shown in FIG. 7 can be improved as compared with an intermediate area MA' of the touch sensor according to the second embodiment shown in FIG. 6. Accordingly, visibility can be enhanced.

Figure 8:
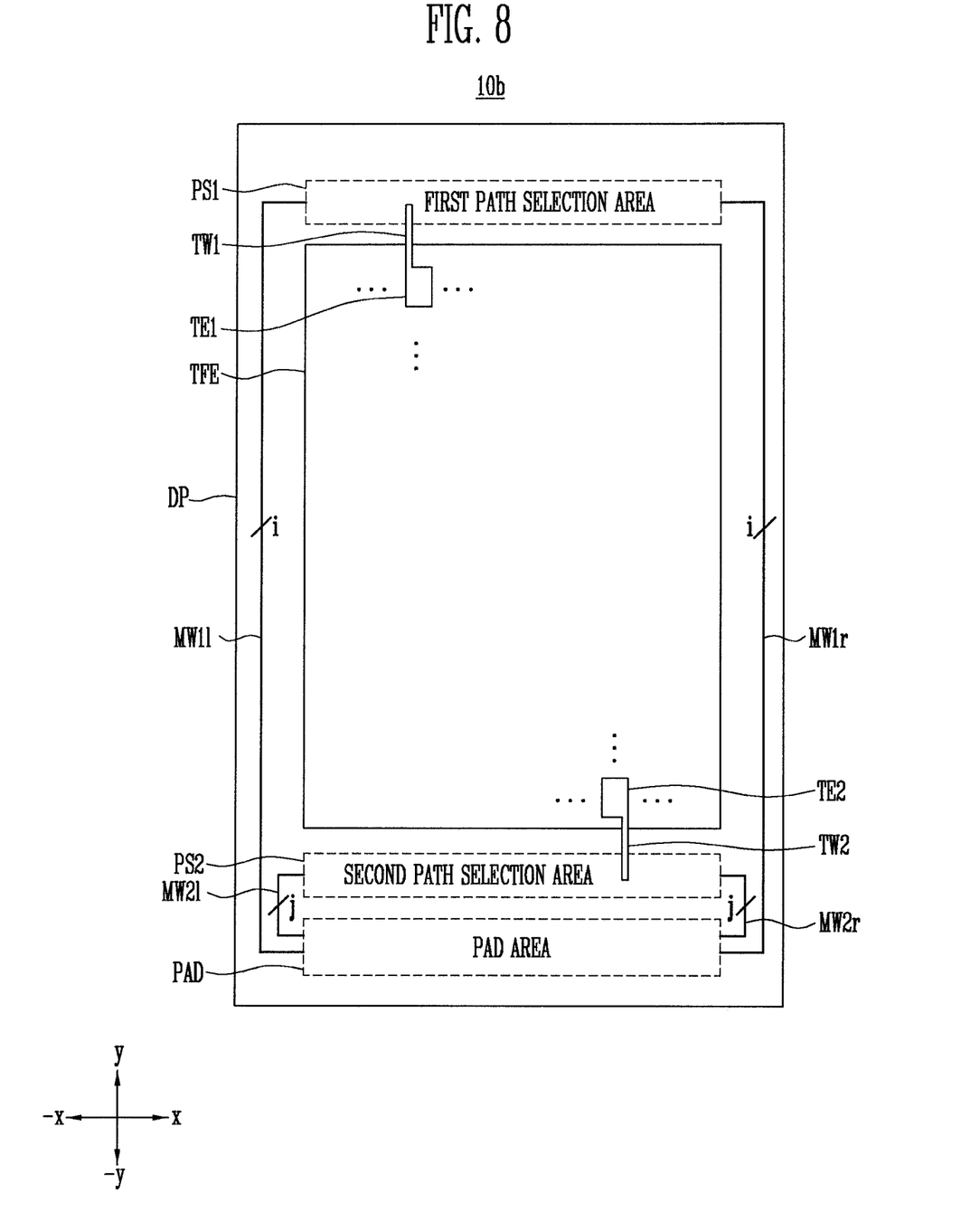
FIG. 8 is a view illustrating an arrangement of multiplexer lines according to an embodiment of the present disclosure.

FIG. 8 is a view illustrating an arrangement of multiplexer lines according to an embodiment of the present disclosure.

A touch display device 10b of FIG. 8 includes multiplexer lines MW1l and MW2l extending adjacent to one side of the pixel area PXS and multiplexer lines MW1r and MW2r extending adjacent to the other side of the pixel area PXS. On FIG. 8, the one side of the pixel area PXS may be a left side, and the other side of the pixel area PXS may be a left side.

Each of the multiplexer lines MW1l and MW1r may be configured with i multiplexer lines to extend from a first path selection area PS1. Here, i is a natural number.

Each of the multiplexer lines MW2l and MW2r may be configured with j multiplexer lines to extend from a second path selection area PS2. Here, j is a natural number.

In the first embodiment shown in FIG. 4, the first multiplexer line MW1 may correspond to the multiplexer line MW1l, and the third multiplexer line MW3 may correspond to the multiplexer line MW1r. In addition, the second multiplexer line MW2 may correspond to the multiplexer line MW21, and the fourth multiplexer line MW4 may correspond to the multiplexer line MW2r.

In the second embodiment shown in FIG. 6, the first and second multiplexer lines MW1' and MW2' may correspond to the multiplexer line MW1l, and the (n−3)'th and (n−2)'th multiplexer lines MW(n−3)' and MW(n−2)' may correspond to the multiplexer line MW1r. In addition, the third and fourth multiplexer lines MW3' and MW4' may correspond to the multiplexer line MW21, and the (n−1)'th and n'th multiplexer lines MW(n−1)' and MWn' may correspond to the multiplexer line MW2r.

In the third embodiment shown in FIG. 7, the first and second multiplexer lines MW1" and MW2" may correspond to the multiplexer line MW1l, and the (n−3)"th and (n−2)"th multiplexer lines MW(n−3)" and MW(n−2)" may correspond to the multiplexer line MW1r. In addition, the third and fourth multiplexer lines MW3" and MW4" may correspond to the multiplexer line MW21, and the (n−1)"th and n"th multiplexer lines MW(n−1)" and MWn" may correspond to the multiplexer line MW2r.

According to the present embodiment, the positions of the multiplexer lines MW1l, MW21, MW1r, and MW2r are efficiently distributed in the display panel DP, so that the area necessary for lines can be reduced. Further, it is possible to help the display device 10b to achieve a narrow bezel.

Figure 9:
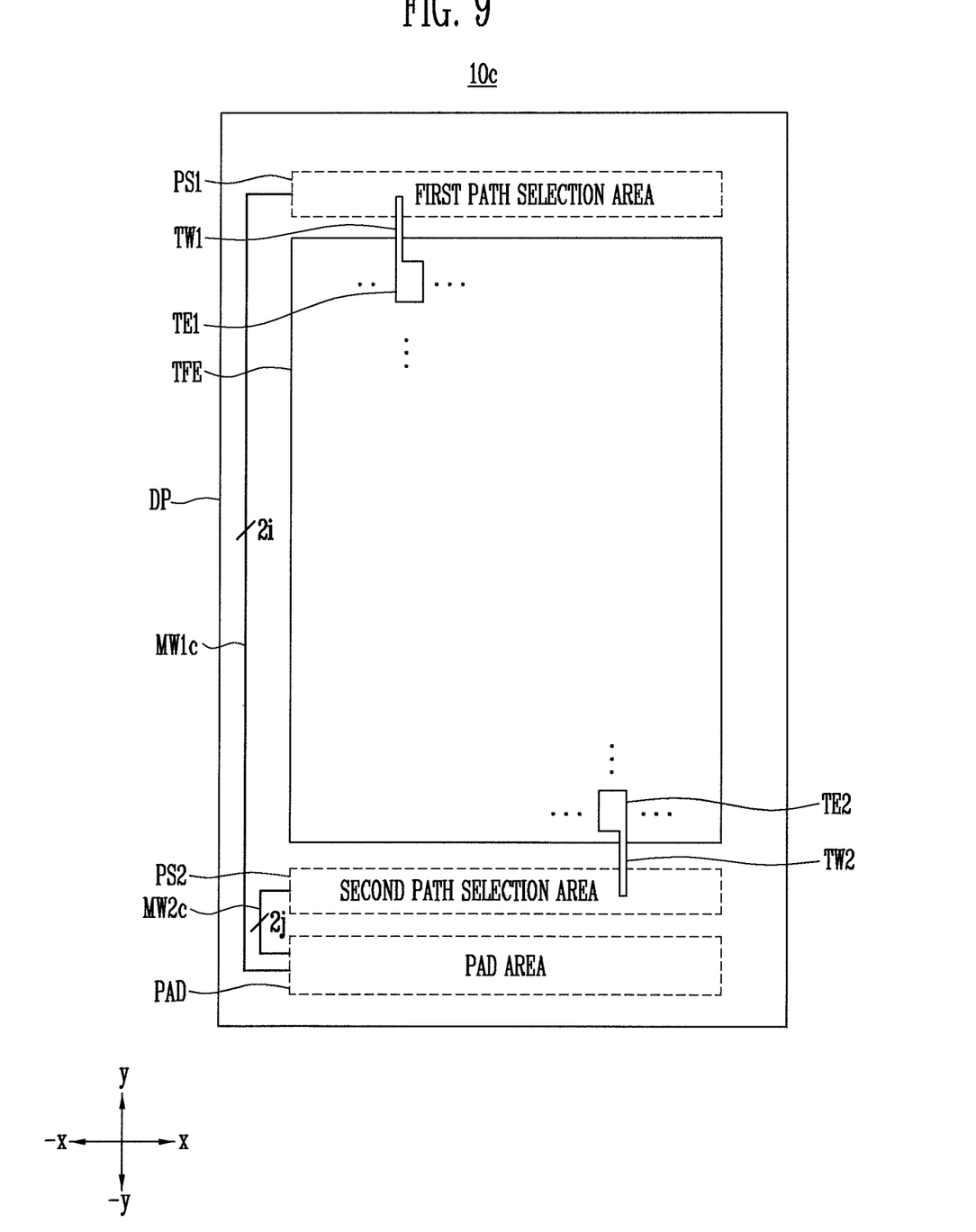
FIG. 9 is a view illustrating an arrangement of multiplexer lines according to another embodiment of the present disclosure.

FIG. 9 is a view illustrating an arrangement of multiplexer lines according to another embodiment of the present disclosure.

A touch display device 10c of FIG. 9 includes multiplexer lines MW1c and MW2c extending adjacent to one side of the pixel area PXS. On FIG. 8, the one side of the pixel area PXS may be a left side.

In the embodiment of FIG. 9, the multiplexer lines MW1c and MW2c may be concentratedly arranged at one side of the display panel DP, if necessary.

According to the present disclosure, the touch sensor and the touch display device including the same have spatial efficiency and can improve visibility.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, with functional equivalents thereof to be included.

What is claimed is:
1. A touch sensor comprising:
first touch electrodes respectively coupled to first touch lines, the first touch electrodes being arranged on a first column;
second touch electrodes respectively coupled to second touch lines, the second touch electrodes being arranged on a second column that is adjacent to the first column in a row direction;
a first multiplexer to which the first touch lines are coupled; and
a second multiplexer to which the second touch lines are coupled,
wherein the first touch electrodes have respective areas that become smaller as they become closer to the first multiplexer along a first direction,
wherein the second touch electrodes have respective areas that become smaller as they become closer to the second multiplexer along a second direction,
wherein the first direction and the second direction are opposite to each other,
wherein each of the first touch electrodes and the second touch electrodes has either a rectangular shape having a first side and a second side parallel to the first side, or a rhombus shape having a first vertex and a second vertex,
wherein the first touch electrodes are aligned such that either their first sides or their first vertices are located on a first straight line extending in a column direction, and such that either their second sides or their second vertices are differently offset from the first straight line,
wherein the second touch electrodes are aligned such that either their first sides or their first vertices are located on a second straight line extending in the column direction, and such that either their second sides or their second vertices are differently offset from the second straight line,
wherein the first and second touch lines are between the first straight line and the second straight line, and
wherein the second sides or the second vertices of the first touch electrodes and the second sides or the second vertices of the second touch electrodes are in between the first straight line and the second straight line.

2. The touch sensor of claim 1, wherein a first touch electrode having a smallest area among the first touch electrodes is located on a same row as a second touch electrode having a largest area among the second touch electrodes, and
wherein a second touch electrode having a smallest area among the second touch electrodes is located on a same row as a first touch electrode having a largest area among the first touch electrodes.

3. The touch sensor of claim 2, wherein a number of touch lines between the first and second touch electrodes on each of respective rows is the same for all of the rows, and
wherein the touch lines comprise at least some of the first touch lines and the second touch lines.

4. The touch sensor of claim 3, wherein the sum of areas of first and second touch electrodes on each of respective rows are the same for all of the rows.

5. The touch sensor of claim 1, wherein a number of touch lines between the first and second touch electrodes on each of respective rows are the same for all of the rows, and
wherein the touch lines comprise at least some of the first touch lines and the second touch lines.

6. The touch sensor of claim 1, wherein each of the first touch lines has a shape that extends obliquely from one vertex of a corresponding first touch electrode to be bent in the first direction, and
wherein each of the second touch lines has a shape that extends obliquely from one vertex of a corresponding second touch electrode to be bent in the second direction.

7. A touch display device comprising:
a touch sensor; and
a display panel combined with the touch sensor,
wherein the touch sensor comprises:
first touch electrodes respectively coupled to first touch lines, the first touch electrodes being arranged on a first column;

second touch electrodes respectively coupled to second touch lines, the second touch electrodes being arranged on a second column that is adjacent to the first column in a row direction;

a first multiplexer to which the first touch lines are coupled; and a second multiplexer to which the second touch lines are coupled, wherein the first touch electrodes have respective areas that become increasingly smaller as they approach the first multiplexer along a first direction, and the second touch electrodes have respective areas that become increasingly smaller as they approach the second multiplexer along a second direction, wherein the first direction and the second direction are opposite to each other, wherein each of the first touch electrodes and the second touch electrodes has a rectangular shape having a first side and a second side parallel to the first side, or a rhombus shape having a first vertex and a second vertex, wherein the first touch electrodes are aligned such that their first sides or their first vertices are located on a first straight line extending in a column direction, and such that their second sides or their second vertices are differently offset from the first straight line, wherein the second touch electrodes are aligned such that their first sides or their first vertices are located on a second straight line extending in the column direction, and such that their either their second sides or second vertices are differently offset from the second straight line, wherein the first and second touch lines are between the first straight line and the second straight line, wherein the second sides or the second vertices of the first touch electrodes and the second sides or the second vertices of the second touch electrodes are in between the first straight line and the second straight line, and wherein the display panel comprises:
a pixel area comprising pixels on a bottom of the first touch electrodes and the second touch electrodes;
a pad area comprising pad electrodes;
a first path selection area in which the first multiplexer is located; and
a second path selection area in which the second multiplexer is located.

8. The touch display device of claim 7, wherein the touch sensor further comprises:
third touch electrodes respectively coupled to third touch lines, the third touch electrodes being arranged on a third column that is adjacent to the second column in the row direction;
fourth touch electrodes respectively coupled to fourth touch lines, the fourth touch electrodes being arranged on a fourth column that is adjacent to the third column in the row direction;
a third multiplexer coupled to the third touch lines, the third multiplexer being located in the first path selection area; and
a fourth multiplexer coupled to the fourth touch lines, the fourth multiplexer being located in the second path selection area.

9. The touch display device of claim 8, further comprising:
a first multiplexer line coupling the first multiplexer to some of the pad electrodes;

a second multiplexer line coupling the second multiplexer to some of the pad electrodes;
a third multiplexer line coupling the third multiplexer to some of the pad electrodes; and
a fourth multiplexer line coupling the fourth multiplexer to some of the pad electrodes.

10. The touch display device of claim 9, wherein the first multiplexer line and the second multiplexer line extend adjacent to one side of the pixel area, and
wherein the third multiplexer line and the fourth multiplexer line extend adjacent to another side of the pixel area.

11. The touch display device of claim 9, wherein the first multiplexer line, the second multiplexer line, the third multiplexer line, and the fourth multiplexer line extend adjacent to one side of the pixel area.

12. A touch sensor comprising:
first touch electrodes respectively coupled to first touch lines, the first touch electrodes being respectively arranged on a first column and a second column that is adjacent to the first column in a row direction;
second touch electrodes respectively coupled to second touch lines, the second touch electrodes being respectively arranged on the first column and the second column;
a first multiplexer coupled to the first touch lines coupled to the first touch electrodes arranged on the first column;
a second multiplexer coupled to the first touch lines coupled to the first touch electrodes arranged on the second column;
a third multiplexer coupled to the second touch lines coupled to the second touch electrodes arranged on the first column; and
a fourth multiplexer coupled to the second touch lines coupled to the second touch electrodes arranged on the second column,
wherein the first touch electrodes have respective areas that become increasingly smaller as they approach the first multiplexer or the second multiplexer along a first direction,
wherein the second touch electrodes have respective areas that become increasingly smaller as they approach the third multiplexer or the fourth multiplexer along a second direction,
wherein the first direction and the second direction are opposite to each other,
wherein each of the first touch electrodes and the second touch electrodes has a rectangular shape having a first side and a second side parallel to the first side,
wherein the first touch electrodes on the first column and the second touch electrodes on the first column are aligned such that their first sides are located on a first straight line extending in a column direction, and such that their second sides are differently offset from the first straight line,
wherein the first touch electrodes on the second column and the second touch electrodes on the second column are aligned such that their first sides are located on a second straight line extending in the column direction, and such that their second sides are differently offset from the second straight line,
wherein the first and second touch lines are between the first straight line and the second straight line, and wherein the second sides of the first touch electrodes and the second sides of the second touch electrodes are in between the first straight line and the second straight line.

13. The touch sensor of claim 12, wherein a number of first touch lines coupled to the first multiplexer, a number of first touch lines coupled to the second multiplexer, a number of second touch lines coupled to the third multiplexer, and a number of second touch line coupled to the fourth multiplexer are the same.

14. The touch sensor of claim 12, wherein a number of first touch electrodes arranged on the second column is greater than that of first touch electrodes arranged on the first column, and wherein a number of second touch electrodes arranged on the first column is greater than that of second touch electrodes arranged on the second column.

\* \* \* \* \*